United States Patent [19]

Müller et al.

[11] 4,405,751

[45] Sep. 20, 1983

[54] AQUEOUS AMINOPLASTIC RESIN DISPERSIONS

[75] Inventors: Hanns P. Müller, Odenthal; Kuno Wagner, Leverkusen; Peter Mummenhoff, Cologne; Gottfried Wallpott, Neuss; Karlheinz Scheuss, Krefeld, all of Fed. Rep. of Germany

[73] Assignee: Bayer Aktiengesellschaft, Leverkusen, Fed. Rep. of Germany

[21] Appl. No.: 355,644

[22] Filed: Mar. 8, 1982

[30] Foreign Application Priority Data

Mar. 28, 1981 [DE] Fed. Rep. of Germany ....... 3112435

[51] Int. Cl.$^3$ .............................................. C08L 61/28
[52] U.S. Cl. ................... 524/720; 524/100; 524/190; 524/199; 524/211; 524/212; 524/512; 524/597; 524/598; 524/715; 524/728; 524/839; 524/843; 428/530
[58] Field of Search ............... 524/100, 190, 199, 211, 524/212, 512, 597, 598, 715, 720, 728, 839, 843; 428/530

[56] References Cited

U.S. PATENT DOCUMENTS 4,160,754 7/1979 Schäpel et al. ..................... 524/765

Primary Examiner—Theodore E. Pertilla
Attorney, Agent, or Firm—Sprung, Horn, Kramer & Woods

[57] ABSTRACT

Aminoplastic resin dispersions which are stable to sedimentation are obtained by condensation of aldehydes with aminoplastic resin formers in an aqueous medium, in the presence of water-soluble compounds of the formula

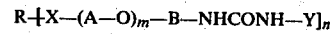

$$R + X-(A-O)_m-B-NHCONH-Y]_n$$

having the substituent meanings mentioned in the description. The condensation is preferably carried out in the presence of dyestuffs or optical brighteners which have groups capable of condensation. The dispersions obtained thereby are particularly suitable for whitening the coating compositions used in the paper industry, and for coating paper, wood, films and textile materials.

9 Claims, No Drawings

AQUEOUS AMINOPLASTIC RESIN DISPERSIONS

The invention relates to optionally coloured or whitened aqueous aminoplastic resin dispersions which are stable to sedimentation, as well as the use thereof in paper coating compositions.

The term "aminoplastic resin"—also sometimes called "amide resins" or "amine resins" in the literature (see Römpp's Chemie Lexikon, 8th edition, page 175)—is intended to be understood, within the scope of this invention, in the widest context, that is to say as condensation products of aldehydes with aminoplastic resin formers containing amino groups, imino groups or amide groups. Urea/formaldehyde condensates are preferred.

In the preparation of these polycondensates, which are also designated as UF polymers, in aqueous solution, these polycondensates are customarily filtered off, dried, ground and redispersed for use in aqueous media.

These procedures are time-consuming and expensive.

It has now been found, surprisingly, that this expenditure can be dispensed with and aminoplastic resin dispersions which are stable to storage can be directly prepared if the condensation of the aldehydes with the aminoplastic resin formers is carried out in aqueous medium, in the presence of water-soluble compounds of the formula

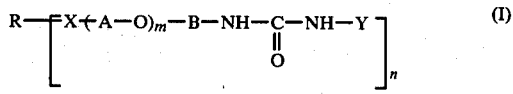

wherein
R represents an n-valent hydrocarbon radical,
X represents O, NR', —CONH— or —COO—,
A represents a similar or different alkylene radical,
B represents —CHR'— or —OC—NH—Z—,
Y represents H or an optionally substituted alkyl radical,
R' represents H, lower alkyl or phenyl, and
Z represents a radical such as that formed by removal of the isocyanate groups from an organic diisocyanate,
n represents an integer from 1 to 6 and
m represents an integer from 5 to 100.

Suitable radicals R are n-valent $C_1$–$C_{20}$-alkane radicals, $C_3$–$C_{20}$-alkene radicals, cyclohexane radicals and benzene radicals which are optionally substituted preferably by $C_1$–$C_{13}$-alkyl radicals. $C_1$–$C_6$-alkyl radicals are preferred.

The radical X preferably represents an oxygen atom.

Suitable alkylene radicals A are those of the formulae —$CH_2$— and especially —$CH_2$—CHR'—.

Preferred radicals R' are H and $C_1$–$C_4$-alkyl (particularly methyl).

Suitable alkyl radicals Y are $C_1$–$C_4$-alkyl radicals and $CH_2$-NHCONH$_2$. However, Y preferably represents hydrogen.

Preferred radicals Z are such radicals as those which are derived from the diisocyanates listed further below.

Within the scope of the formula I, those compounds are in turn preferred which correspond to the formula (II)

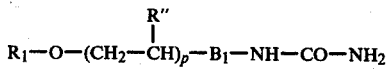

wherein
$R_1$ represents $C_1$–$C_{12}$-alkyl, preferably $C_4$–$C_8$-alkyl,
R" represents H or $CH_3$ in any desired arrangement,
$B_1$ represents —$CH_2$— or —OC—HN—$Z_1$—,
$Z_1$ represents 1,3(1,4)-phenylene, 2,4(2,6)-toluylene, hexahydrotoluylene, $C_2$($C_4$-, $C_6$- or $C_{12}$)-alkylene, cyclohexylene, perhydrodiphenylmethylene, diphenylmethylene or the radical of the formula

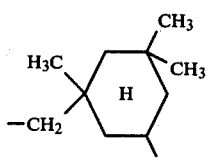

and
p represents an integer of 10–50.

The compounds of the formula I are obtained, for example, by a process in which a polymer of the formula

is reacted with n equivalents of a diisocyanate of the formula

and is then reacted with n equivalents of an amine of the formula

Preferred amines of the formula V are $C_1$–$C_4$-alkylamines and especially ammonia. Suitable diisocyanates of the formula IV are those described in U.S. Pat. No. 4,160,754, column 5. Particularly preferred among these diisocyanates are the industrially readily accessible diisocyanates, for example hexamethylene diisocyanate, isophoron diisocyanate, and 2,4- and 2,6-toluylene diisocyanate, as well as any desired mixtures of these isomers.

In the preparation of the preferred urea/formaldehyde aminoplastic resins, the synthesis of the compounds of the formula I (wherein B=$CH_2$ and Y=H) is advantageously effected in situ by a process in which a compound of the formula III is first reacted, in an aqueous medium at pH 1–7, preferably 1–4, with n equivalents of urea and 2 n equivalents of formaldehyde to give an appropriate compound of the formula I, and the preparation of the urea/formaldehyde aminoplastic resin (polymethyleneurea) is then carried out, in a manner which is in itself known, in the same reaction medium—that is to say without any intermediate isolation.

In a particularly preferred embodiment of the preparation of the dispersion according to the invention, the polycondensation of the aldehydes with the aminoplastic resin formers is carried out in the presence of dyestuffs or optical brighteners which have groups capable of condensation.

Suitable dyestuffs and brighteners are customary substantive paper dyestuffs or brighteners which contain at least one amino group, amide group and/or hydroxyl group capable of condensation.

The use of optical brighteners, particularly those of the bistriazinylaminostilbene series, is preferred.

Particularly suitable brighteners correspond to the formula

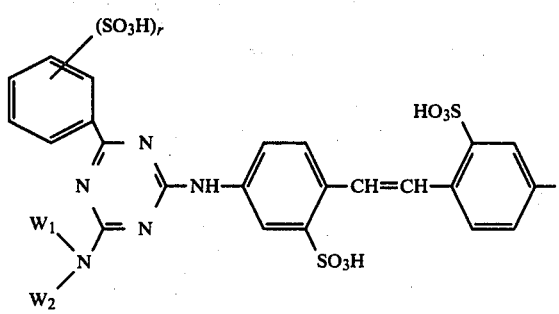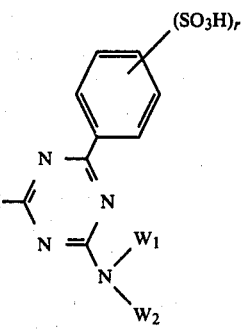

wherein
$W_1$ denotes $C_2$–$C_4$-hydroxyalkyl,
$W_2$ denotes H, $C_1$–$C_4$-alkyl or $W_1$, and
r denotes a number from 0 to 2.

Suitable polymers III for the preparation of the dispersing agents I customarily are preferably monofunctional polyethers and polyacetals.

Examples of suitable polyethers are those which are obtained by polymerisation of epoxides (for example ethylene oxide, propylene oxide and butylene oxide, as well as tetrahydrofuran, styrene oxide and epichlorohydrin) with themselves, (for example in the presence of $BF_3$) or by the addition of these epoxides (optionally in a mixture or successively) to starting components having reactive hydrogen atoms, such as water, alcohols or amines.

Diols, such as ethylene glycol, diethylene glycol, triethylene glycol, dipropylene glycol and dibutylene glycol, and especially monohydric lower alcohols, such as ethanol, propanol, butanol and hexanol, are suitable as starting components.

The compounds which can be prepared from glycols, such as diethylene glycol, triethylene glycol, 4,4'-dihydroxyethoxydiphenyldimethylmethane and hexanediol, and formaldehyde are examples of suitable polyacetals. Polyacetals which are suitable according to the invention can also be prepared by polymerisation of cyclic acetals.

Suitable aldehydes for the preparation of aminoplastic resins are, in particular, the industrially readily accessible and therefore inexpensive types, such as, for example, acetaldehyde, butyraldehyde, benzaldehyde, salicylaldehyde and particularly formaldehyde, preferably in aqueous solution.

Suitable aminoplastic resin formers are likewise the types which are customary in practice, such as those described, for exampale, in U.S. Pat. No. 4,160,754 (columns 4–5 and 9–13; corresponding to DE-OS (German Published Specification) 2,714,198, pages 10–13 and 24–29).

Urea and melamine, or the lower molecular weight N-methylol derivatives thereof, are preferred.

For activating the aminoplastic resin formation, and therefore for hardening the UF polymers, all known condensation catalysts can be used, such as, for example, formic acid, hydrochloric acid, sulphuric acid, phosphoric acid, acetic acid, thioacetic acid and maleic acid, and of course also bases, such as sodium hydroxide, potassium hydroxide, calcium hydroxide, barium hydroxide, zinc oxide and magnesium oxide, phosphoric acids, phosphates, primary and secondary potassium hydrogen phosphate, ammonium sulphate, numerous organic acid anhydrides etc., compounds which split off acid, such as ammonium chloride, trimethylammonium formate, chloral hydrate, the amine salt of formic acid and other organic carboxylic acids, maleic acid half esters, tert.-amine salts etc., dibenzoyl peroxide, carbonic acid, N-carbamic acid, glycol chlorohydrin, glycerol chlorohydrin, epichlorohydrin, and the most diverse copper, zinc, Sn(II), cadmium and magnesium salts or organic acids. The most diverse metal oxides, or the hydrates thereof, can also be used.

Activators which are preferably to be employed in the process according to the invention are hydrochloric acid, sulphuric acid, phosphoric acid, formic acid, maleic acid, sodium hydroxide, potassium hydroxide, barium hydroxide, benzyldimethylamine and triethylamine.

The activators are employed, in general, in quantities of 0.05–5 percent by weight, preferably 0.2–2 percent by weight, relative to the total quantity of all reaction components participating in the polycondensation.

The process for the preparation of the preferred aminoplastic resin dispersions which are stable to sedimentation is advantageously carried out in such a manner that a compound of the formula I, together with low molecular weight urea, an optical brightener and formalin, are intially introduced into a vessel. A pH of 4 is established in the homogeneous mixture by the addition of phosphoric acid. The UF dispersion then forms at 60° C., during the course of half an hour, by means of a condensation reaction. The mixture is then adjusted to a pH value of 8–8.5 by the addition of aqueous NaOH and is diluted to a concentration of 50% (solids) by the addition of water.

In the particularly preferred embodiment of the process according to the invention, a monofunctional polyether of the formula III (molecular weight 200–6,000, preferably 700–3,000) is linked with urea and formaldehyde in the presence of a small quantity of water, at pH 2, to give the corresponding O-N-acetal. The long chain O-N-acetal with the methylolurea end group is capable of condensation with further quantities of urea and formaldehyde and the reactive groups of the optical brightener, so that when the reaction is continued at pH 4, in the manner mentioned above, stable aminoplastic resin dispersions are obtained directly ("one-pot process"). A pH of 8–8.5 is established by subsequent addition of NaOH.

The dispersions thus obtained have, in general, the following composition:

10 to 50% by weight of water,
25 to 45% by weight of polymers of the formulae III or I,
1 to 20% by weight of aminoplastic resin formers (for example urea),
0.5 to 10% by weight of aldehyde,
0.1 to 10% by weight of brightener, and
0 to 5% by weight of diisocyanate.

These dispersions can be incorporated directly—if necessary after appropriate dilution—into the coating compositions in paper manufacture and produce thereby some interesting effects for application technology.

The dispersions according to the invention which contain whiteners are very particularly valuable. These are outstandingly suitable for whitening the optionally pigmented coating compositions customarily used in the paper industry. These coating compositions contain, as binders, plastic dispersions based on copolymers of butadiene/styrene, acrylonitrile/butadiene/styrene, acrylates, ethylene/vinyl chloride and ethylene/vinyl acetate; homopolymers, such as polyvinyl chloride, polyvinylidene chloride, polyethylene, polyvinyl acetate or polyurethane.

Aluminium silicates, such as China clay and kaolin, and also barium sulphate, satin white, titanium dioxide or calcium compositions for paper are customarily used for pigmenting coating compositions. These are described, for example, in J. P. Casey "Pulp and Paper; Chemistry and Chemical Technology", 2nd edition, Vol. III, pages 1648-1649, and in McGraw-Hill "Pulp and Paper Manufacture", 2nd edition, Vol. II, page 497, or in EP-OS (European Published Specification) 0,003,568.

The preparations according to the invention can be used for coating paper, wood, films, textile materials, non-woven materials and suitable building materials. The use on paper and cardboard, as well as on photographic papers, is particularly preferred.

The coating can be applied to the substrate and dried by any conventional process, for example using an air blade, a coating blade, a brush, a roll, a doctor blade or a bar. The degree of whiteness obtainable can frequently be improved by drying at elevated temperatures.

The layers or coatings thus obtained possess, in addition to a good fastness to light, an excellent degree of whiteness, the undesired decrease in the wet strength of the coatings, which decrease is otherwise to be observed, as a result of the addition of the carrier, in coating compositions which contain only a synthetic binder, not occurring.

In addition, uniformity, smoothness, volume and printability properties are improved because the polymethylene urea whitener dispersion according to the invention remains in the pigment matrix as an additional filler and favourably affects this matrix with respect to the printability.

The addition of the preparations according to the invention to a layering composition or coating composition is simple and occurs in a manner which is customary when using known whiteners, preferably at the end of the preparation of the coating compositions, after the binder has already been stirred in.

The quantity of the whitener aminoplastic resin dispersion to be incorporated depends on the type of substrate and the desired degree of whiteness and is generally 0.1 to 30, preferably 0.5 to 15 g of whitener active compound per kg of coating composition.

EXAMPLE 1

1,400 g (0.7 mol) of a polyether (molecular weight=2,000) started from n-butanol are melted at 60° C. A solution consisting of 42 g (0.7 mol) of urea and 113.4 g (1.4 mol) of 37% strength formaldehyde is added to this melt. After the solution has been completely mixed, 5.6 ml of 85% strength phosphoric acid are added to it. The pH of the mixture is adjusted to 2 by the addition of acid. A white dispersion then forms, in a slightly exothermic reaction, during the course of 15 minutes at 60°-63° C. A solution of 275 g of brightening agent 28 (C.I. 40622) and 275 g of urea in 550 g of water are then added, in one charge, to this dispersion. A pH of 4 is established in the mixture by this addition. The mixture is stirred for 15 minutes at 58°-60° C. 700 g of water and 63 ml of 10% strength NaOH solution are then added to the mixture, whereby the pH of the mixture is adjusted to 8.4. An approx. 50% strength polymethyleneurea whitener dispersion which is stable to sedimentation is obtained by again adding 670 g of water.

EXAMPLE 2

A so-called natural-binder-free coating composition, consisting of 350 g of filler based on kaolin, 350 g of China clay, 350 g of chalk, 2 g of sodium polyphosphate, 3 g of polyacrylate binder, 100 g of butadiene/styrene copolymer binder, 5 g of ammonium stearate, 3 g of carboxymethylcellulose and 840 g of water, is adjusted to pH 8.5 with ammonia water, and 30 g of the polymethyleneurea dispersion which contains whitener and which is obtained according to Example 1 are added to the mixture. 15 g of the coating composition thus prepared are applied with a doctor blade, in a customary manner, to 1 square meter of raw paper. After drying at 100° C., a coated paper is obtained which has a good opacity and smoothness, as well as a high degree of whiteness and outstanding fastness to light, so that it is excellently suited to printing by the offset process.

EXAMPLE 3

A solution of 6 g (0.1 mol) of urea in 16.2 g (0.2 mol) of formalin (37%) is added, in one charge, to a melt of 200 g (0.1 mol) of polyethylene glycol of molecular weight 1,550, at 60° C. The mixture is adjusted to a pH value of 1 by the addition of 0.8 ml of phosphoric acid (85%). A white dispersion is formed immediately. The dispersion is then stirred for another 15 minutes at 60° C. and for a further 15 minutes at 80° C. The mixture is then allowed to cool to 60° C., diluted with 100 ml of water and adjusted to a pH value of 8.5 with 8 ml of sodium hydroxide solution (10%). After further dilution with 115 ml of water, an approx. 50% strength dispersion is obtained which is stable to sedimentation and which is outstandingly suitable for incorporation in paper coating compositions based on synthetic resins.

EXAMPLE 4

(a) 1,000 g (0.5 mol) of a polyethylene (propylene) glycol started from N,N-diethylaminoethanol and having a molecular weight of 2,200, and 1 ml of benzoyl chloride are mixed and are dehydrated for 30 minutes at 120° C. and 20 mbars. 84 g (0.5 mol) of hexamethylene diisocyanate are added, in one charge, to the resulting solution at 70° C. The reaction mixture is then stirred, under nitrogen, for 20 minutes at 120° C. The NCO content is then 1.93% (calculated 1.94%).

The reaction mixture is added dropwise, from a heated dropping funnel, to a solution of 34.25 g of aqueous ammonia (25%) in 1,100 ml of water, the internal temperature increasing from 20° to 46° C. An approx. 50% strength solution of the dispersing agent of the formula

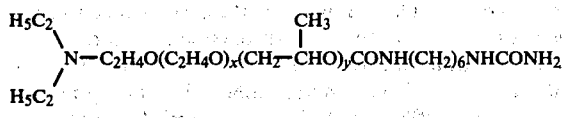

is obtained.

(b) 218.5 g (0.05 mol) of this solution are mixed with an aqueous solution of 16.59 g (0.015 mol) of the brightener of the formula

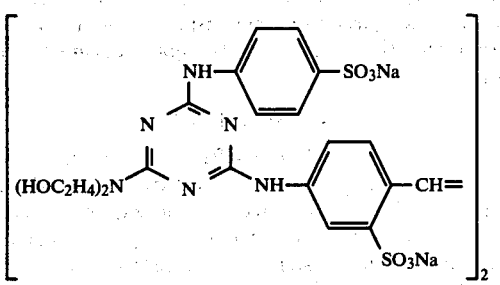

and 17.13 (0.285 mol) of urea in 35 ml of water. After the addition of 31.2 g of formaldehyde solution (37%; 0.35 mol), the mixture is adjusted to a pH value of 4 with 0.6 ml of phosphoric acid (83%). The mixture is now stirred for 9 hours at room temperature, before 2 ml of NaOH (40%) are added in order to establish a pH of 11.

A polymethyleneurea dispersion which is ready for use, which is stable to storage and which contains whitener is obtained.

(c) The polyether employed in (a) was prepared as follows: 117 g (1 mol) of diethylethanolamine and 500 g of toluene are initially introduced into the reaction vessel at room temperature. The atmospheric oxygen is removed by twice evacuating and refilling the reaction vessel with nitrogen. After the mixture has been warmed to 80° C., 5.6 g of 50% strength aqueous potassium hydroxide solution are added. The mixture is then further warmed. The solution water and water of reaction are distilled off azeotropically between 100° and 115° C. After the distillation has ended, a mixture of 5.39 mols (312 g) of propylene oxide and 30.77 mols (1,354 g) of ethylene oxide are gradually metered into the readily stirrable mixture at 100°–105° C. and at a pressure of from 0.4 to 0.6 bar. The reaction temperature is maintained in this range by cooling or heating the reaction mixture as required. After the addition has ended, a further 9.47 mols (416 g) of ethylene oxide are gradually metered into the reaction mixture. After the alkylene oxide addition has ended (approx. 6 hours), the mixture is stirred for a further 3 hours at 100°–105° C.

After the addition of 300 g of $H_2O$, the alkaline polymer is neutralised with 0.05 mol of $H_2SO_4$ (9.8 g, 50% strength). The water is then distilled off in vacuo, at 70°–90° C., after the addition of filtration auxiliaries (cellulose powder) and an anti-oxidant (2,6-di-tert.-butyl-p-cresol).

The precipitated salts and the filtration auxiliary constituent are filtered off (at 60° C.) at a water content of 0.9%. For complete removal of the water, the filtrate is then distilled in vacuo at 100°–105° C.

The resulting slightly yellow product has the following physical data:

| | |
|---|---|
| hydroxyl number: | 123 |
| pH value: | 8.5 |
| water content: | 0.05 |
| $\overline{MW}$: | 2,200 |

EXAMPLE 5

50 g of the whitener/aminoplastic resin dispersion obtained according to Example 4b are incorporated into a coating composition consisting of

| | |
|---|---|
| 850 g of China clay | |
| 99.4 g of chalk, | |
| 1.8 g of sodium polyphosphate, | |
| 1 g of sodium acrylate, | |
| 1.8 g of NaOH (45%), | |
| 730 g of water, | |
| 302 g of a 50% strength acrylate copolymer dispersion (Acronal ® S 320 D type), and | |
| 19 g of carboxymethylcellulose solution (50%) | |
| 2,000 g | |

The raw paper coated with this composition exhibits a high degree of whiteness and a very good fastness to light.

EXAMPLE 6

100 g (0.05 mol) of the polyether used in Example 1 are reacted, analogously to Example 1, with 3 g of urea and 8.1 g of formalin (37%), in the presence of 0.4 ml of phosphoric acid (85%).

90 g of a 15% strength aqueous solution of the dyestuff of the formula

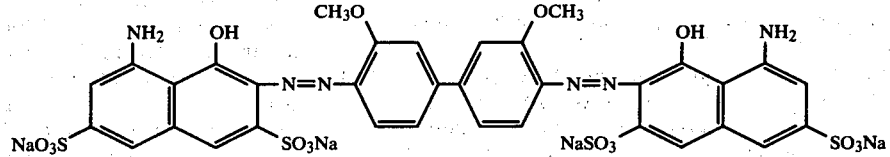

are added to the resulting aqueous dispersion. The mixture is further stirred for another 15 minutes at 50°–55° C., cooled to 20° C. and adjusted to pH 8.4 with 4 ml of 1 N NaOH. After 34 ml of water have been added, an approx. 50% strength blue-colored aminoplastic resin dispersion is obtained which is outstandingly suitable for incorporation in colored paper coating compositions.

We claim:

1. Aqueous dispersions of aminoplastic resins obtained by condensation of aldehydes with aminoplastic resin formers in aqueous medium, in the presence of water-soluble compounds of the formula

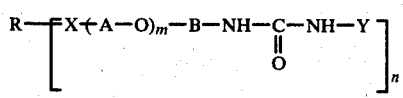

wherein
R represents an n-valent hydrocarbon radical,
X represents O, NR', —CONH— or —COO—,
A represents a similar or different alkylene radical,
B represents —CHR'— or —OC—NH—Z—,
Y represents H or an optionally substituted alkyl radical,
R' represents H, lower alkyl or phenyl and
Z represents a radical such as that formed by removal of the isocyanate groups from an organic diisocyanate,
n represents an integer from 1 to 6 and
m represents an integer from 5 to 100.

2. Aqueous dispersions according to claim 1, characterised in that the aminoplastic resins are polymethylene-urea.

3. Aqueous dispersions according to claim 1, characterised in that the aminoplastic resins are melamine/formaldehyde polycondensates.

4. Aqueous dispersions according to claim 1, characterised in that the aminoplastic resin formation is carried out in the presence of compounds of the formula

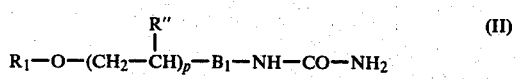

wherein
$R_1$ represents $C_1$-$C_{12}$-alkyl, preferably $C_4$-$C_8$-alkyl,
R" represents H or $CH_3$ in any desired arrangement,
$B_1$ represents —$CH_2$— or —OC—NH—$Z_1$—,
$Z_1$ represents 1,3(1,4)-phenylene, 2,4(2,6)-toluylene, $C_2$($C_4$, $C_6$ or $C_{12}$)-alkylene, $C_6$-cycloalkylene or diphenylmethylene and
p represents an integer of 10-50.

5. Aqueous dispersions according to claim 1, characterised in that the aminoplastic resin formation and the preparation of the compounds of the formula I are carried out in the same reaction vessel.

6. Aqueous dispersions according to claim 1, characterised in that the aminoplastic resin formation and the preparation of the compounds of the formula (I) are carried out "in situ" in the same reaction vessel.

7. Aqueous dispersions according to claim 1, characterised in that the aminoplastic resin formation is carried out in the presence of dyestuffs or optical brighteners capable of condensation.

8. Aqueous dispersions according to claim 1, characterised in that the aminoplastic resin formation is carried out in the presence of brighteners of the formula

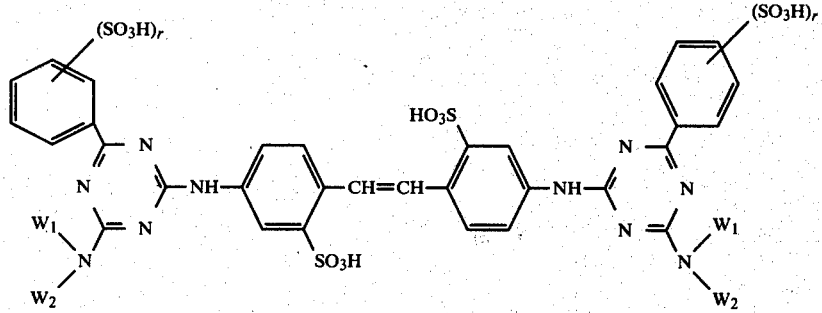

wherein
$W_1$ denotes $C_2$-$C_4$-hydroxyalkyl,
$W_2$ denotes H, $C_1$-$C_4$-alkyl or $W_1$, and
r denotes a number from 0 to 2.

9. In the coating of paper with a composition comprising a dyestuff and/or an optical brightener, an aqueous dispersion of an aminoplastic resin and optionally a pigment to improve the color of the paper, the improvement which comprises directly employing as said dispersion an aqueous dispersion according to claim 1.

* * * * *